March 23, 1954 P. W. CRAPUCHETTES 2,673,296

COMPENSATING CIRCUIT FOR CAVITY RESONATOR DEVICES

Filed Aug. 29, 1950 2 Sheets-Sheet 1

INVENTOR
PAUL W. CRAPUCHETTES
BY [signature]
ATTORNEY

March 23, 1954 P. W. CRAPUCHETTES 2,673,296

COMPENSATING CIRCUIT FOR CAVITY RESONATOR DEVICES

Filed Aug. 29, 1950 2 Sheets-Sheet 2

INVENTOR
PAUL W. CRAPUCHETTES

BY R. P. Morris

ATTORNEY

Patented Mar. 23, 1954 2,673,296

UNITED STATES PATENT OFFICE 2,673,296

COMPENSATING CIRCUIT FOR CAVITY RESONATOR DEVICES

Paul W. Crapuchettes, Palo Alto, Calif., assignor to Litton Industries Inc., San Carlos, Calif., a corporation of California Application August 29, 1950, Serial No. 181,963

5 Claims. (Cl. 250—36)

This invention relates to a compensating circuit for cavity resonating devices and more particularly to a circuit and system for compensating frequency deviation of cavity resonator devices due to thermal effects.

In cavity resonator devices such as magnetrons, velocity modulation tubes, or the like, particularly used as oscillation generators, the frequency stability of the system is a function of the variations in the associated circuit or in the device. All high frequency oscillators require a stabilised supply system if single frequency or monochomatic output is to be achieved. In addition, the circuit constant, particularly of cavity resonator devices, must be temperature controlled to eliminate frequency drift caused by circuit expansion.

In a magnetron or velocity modulation type of tube wherein metallic resonators are utilized the thermal expansion of the resonator elements, and the like will cause variation in the frequency of operation as the device heats up. In a magnetron, for example, the plate dissipation of the magnetron can be transferred only through the vane system to the cooling surface. The heat flow requires temperature gradients which become important frequency determining considerations. This is a particularly difficult problem in the case of oscillators intermittently operating, when it is required that the frequency be stable from initiation of oscillation to operation for various periods of time. If the device is operating continuously, then it will reach a stable heat condition after which normal frequency stabilising equipment may be used.

The geometry of the various cavity resonator constructions is such that compensation for temperature effects by the use of bi-metallic elements is very difficult particularly in view of the heat flow and temperature gradient problems involved.

It is an object of this invention to provide a cavity resonator system and compensating network which will compensate the gradual change in frequency due to thermal effects by a tuner arrangement coupled to the tube. This tuner arrangement in turn is controlled by the use of an electrical equivalent circuit producing correction voltages to control the tuner.

In accordance with this invention the various thermal effects within the cavity resonator may be simulated in electrical equivalents as follows:

Temperature may be considered analogous to voltage, thermal resistivity to electrical resistance;

Heat capacity to capacitance; and

Watt dissipation to current.

Since the frequency deviation is a function of the temperature, a resultant voltage may be derived which may be said to simulate the frequency deviation.

According to a feature of this invention I provide a cavity resonator device which is subject to dimensional changes and consequent frequency deviation due to thermal effects of the signal energy applied thereto, a system for compensating these deviations which includes an electrical network adjusted to produce a control simulating the frequency deviation. The signal energy is applied to the network simultaneously with application to the resonator device and the output voltage variation developed in the network is used for tuning the device to compensate for the thermal frequency deviation.

The invention may be further considered to be applied to a resonator tube such as a magnetron which is supplied intermittently by signal energy from a modulating source. Energy from this source is also applied, at a predetermined level, to a condenser-resistance network simulating an electrical analog in the thermal properties of the resonator. A voltage derived from this network may be considered as representative of the frequency deviation of the tube. This voltage may be compared with a predetermined voltage and caused to adjust the tuning of the tube in direction and magnitude dependent upon the difference between the voltage derived from the network and the supplied signal. With the tuning of the tube the voltage level of the supplied comparison voltage is simultaneously adjusted so that the tuning position of the tube is maintained at the balance point achieved by the system.

The above-mentioned and other features and objects of this invention and the manner of attaining them will become more apparent and the invention itself will be best understood by reference to the following description of the embodiment of the invention taken in conjunction with the accompanying drawings, in which.

Figure 1:
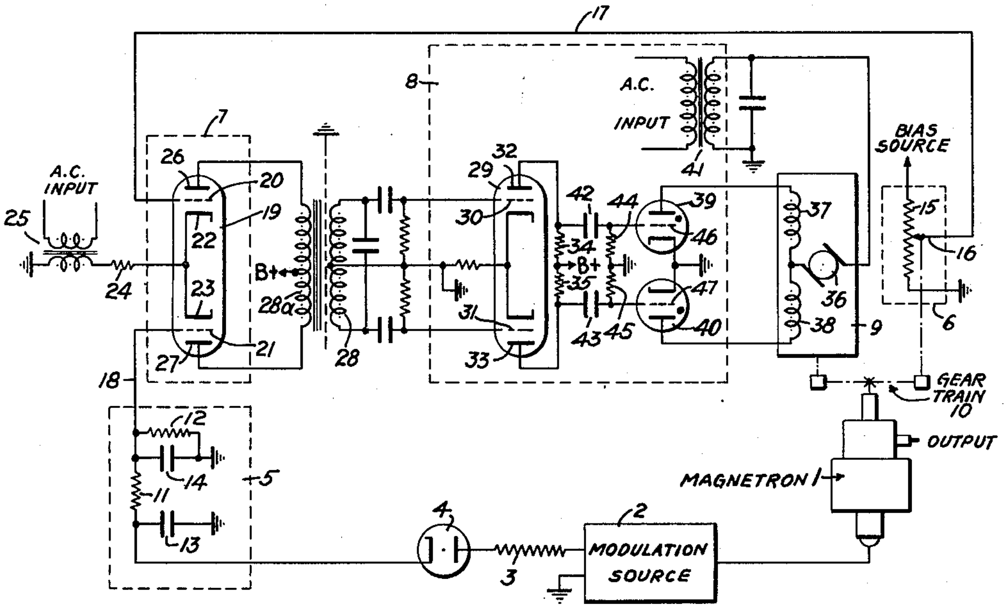
Fig. 1 is a schematic circuit diagram partially in block form illustrating the principles of my invention applied for frequency compensation of a magnetron.

Turning first to Fig. 1, a cavity resonator device such as a magentron is shown at 1, which is shown with operating potential or signal from a source 2. Energy from source 2 is also supplied over an isolating resistor 3 and diode 4 to the compensating or equivalent network 5, designed to provide a replica of the heat properties of tube 1. A comparison source 6 is also provided coupled to a mixer or comparison circuit 7 simultaneously with the voltage from the output of circuit 5. The output from mixer 7 is applied to a tuning control circuit 8 which in turn may operate a tuning adjusting device represented by motor 9 and gear train 10. Gear train 10 is also coupled to adjust the potential from source 6, simultaneously with the tuning of the tube 1.

In greater detail the energy from source 2 is applied over the decoupler resistor 3 and diode 4 to a particular system containing the compensating network 5. As shown in Fig. 1, the network may comprise a pair of resistors 11, 12 and condenser 13 and 14 provide a complex network, an output voltage of which is taken across resistor 12. In a multi-cavity magentron for example, the frequency variation due to the expansion of the vanes occurs in a relatively short period of time which may be termed as fast drift function of the tube, while frequency drift due to expansion of the body of the magnetron occurs over a longer period of time. For example, the expansion of the vanes to their maximum extent may occur in approximately .2 of a second, whereas 2 minutes may be required for the main body to reach the final stable condition. Accordingly, in network 5 condenser 13 together with resistors 11 and 12 provides a fast time constant circuit comparable to the thermal effects of the vanes of the magnetron, while condenser 14 and resistor 12 have a long time constant effect comparable to the magnetron body heating. The comparison energy source 6 may comprise a potentiometer consisting of a resistor 15 and potentiometer slider 16. In normal operation a part of the voltage drop across resistor 15 from a normal bias source is applied over a line 17 to the mixer circuit 7 while the output voltage from compensating network 5 is applied over line 18 to this mixer circuit.

As illustrated, the comparison circuit may comprise a double triode tube 19 although it is clear that separate tubes could be used if desired. Line 17 is coupled to grid 20 while line 18 is coupled to grid 21 of double triode 19. The respective cathodes 22, 23 are coupled through a resistor 24 and a transformer 25 to a source of A. C. input signal which may be for example 110 volt supply energy. The respective anodes 26, 27 of tube 19 are coupled in push-pull to a transformer primary 21. The B supply for the plates 26 and 27 being applied through the center tap in primary 21. It will be clear that when the voltage drop from potentiometer 15, 16 is equal to the voltage drop across resistor 12 no output energy will be applied to the secondary 28 of the transformer. However, when either of these voltages exceeds the other energy will be supplied to secondary 28 with a phase and magnitude dependent upon the direction and amplitude of the difference in these voltage drops.

The energy from the secondary 28 is applied over a coupling network to an amplifier in control circuit 8 comprising a double triode tube 29 having two grids 30 and 31 respectively associated with the respective anode 32, 33. The B supply for the anodes of tube 29 is furnished over load resistors 34, 35 respectively.

Tuning control device 9 may for example, comprise a reversible motor having an armature 36 and two separate field coils 37 and 38. The circuit for which is completed over gas discharge triodes 39 and 40 respectively. A. C. energy for the motor is applied over a transformer 41. This A. C. supply should be of the same frequency as that applied over transformer 25. In order to control the motor in accordance with the compensating voltage from the output of comparator 7, the energy from tube 29 is applied over a network consisting of condensers 42 and 43, and resistors 44, 45 to the grids 46, 47, respectively, of gas discharge triodes 39, 40. The condenser resistor networks 42, 43; 44, 45 are designed to produce a 90° phase shift of the energy supplied at transformer 25 with respect to that supplied from transformer 41. Depending upon the direction of departure of the voltages from potentiometer 15, 16 and resistor 12, one or the other of tubes 39 and 40 will be energized, and complete a circuit through field coils 37 or 38, driving the motor in the direction desired. This motor in turn may adjust the tuning of tube 1 through gear train 10. Simultaneously through gear train 10 potentiometer slider 16 is adjusted to a new level to balance the drop in resistor 12, corresponding to the tuning adjustment of tube 1. It will be clear that the voltage drop across potentiometer 12 will be dependent upon energy, which may be pulses supplied from source 2 which also energizes the tube 7, and consequently proportional to the heating of tube 1 and the detuning caused by this heating. Accordingly, a compensation for the frequency change will be achieved.

The thermal compensator is based upon the electrical analogy to the physical expansion effects. In the physical system of tube 1 and in the electrical system 5, to the extent that the heat transfer properties of the physical system can be determined experimentally or otherwise, the network 5 may be constructed to provide an exact electrical analog. The heat transfer properties of the physical system remain essentially constant throughout the life of the tube. The temperature of the physical structure determines its physical size and hence its operating frequency. Thus if the temperature at a point in the system is determined, the heat flow constants which also determine the physical size of this system are known. The compensating current from the source 2 is adjusted in the network to be proportioned to the heat flow of the physical system so that the voltage across the output resistor is enabled to provide information and control for the tuning adjustment. It will be recognized that the network 5 is essentially a complex integrating network furnishing the ultimate output desired.

Figure 2:
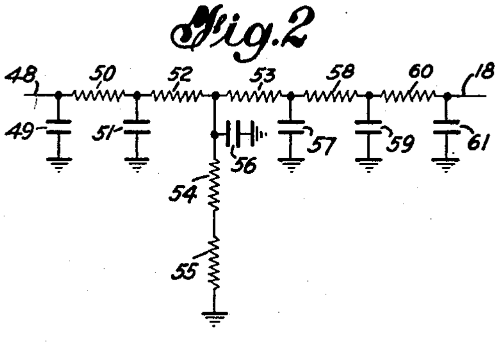
Fig. 2 is a circuit diagram of a simulating electrical network which may be used in place of the network shown in Fig. 1.

Turning now to Fig. 2, there is shown a general complex correction or compensating network which may be used in place of that shown in Fig. 5 as illustrated. In this arrangement the diode 4 may be coupled to point 48 of the network shown in Fig. 2. The capacitor 49 and resistor 50 may be provided to simulate the heat characteristics of the magnetron vanes, a condenser 51 and resistor 52, the temperature characteristics of the magnetron body, another resistor 53 taking care of the characteristic heat resistivity of the body portion. Two other resistors 54 and 55 and a condenser 56 may represent the thermal capacity of the cooling fins and the heat transfer of these vanes. The heat transfer resistor 55 will have a negative temperature coefficient of resistance representing a heat dissipation. The thermal effect of the neck of the magnetron may be simulated by capacitor 57, and resistor 58, the tuner element by capacitor 59 and resistor 60 and the C–L ring of the magnetron by the capacitor 61. The output lead 48 then may be coupled to the comparator device.

It is to be clearly understood that the particular comparator device as shown and the particular tuning control circuit are not essentially features of the invention and many variations thereof will readily occur to those skilled in the art. Where mechanical adjustment of the tuning is desired, it is preferred to use a reversible motor to adjust the tuning. It will be readily apparent, however, that a direct difference in voltage may be obtained and used to adjust the tuning by means of reactance tube or the like in some cases.

Figure 3:
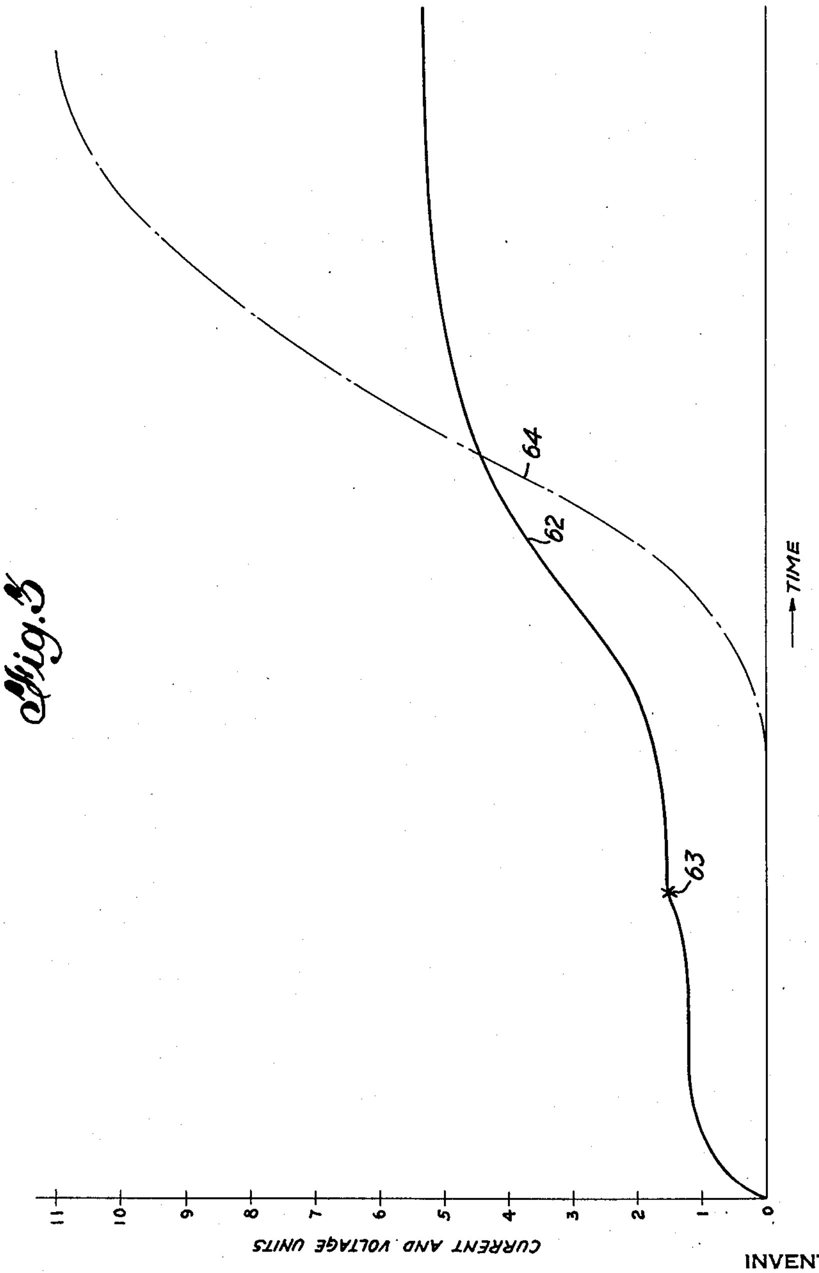
Fig. 3 is a set of curves illustrative of certain principles of my invention.

In Fig. 3 there is illustrated a curve 62 representative of the voltage variation of the output of a network such as 5. This curve represents the voltage cycle over approximately 2 minutes which may be considered as the length of time necessary to heat the tube up to its stable operating condition for continuous operation. It will be noted that the curve 62 rises quite rapidly in time, until a relatively stable condition is reached at approximately 2 voltage units. It remains substantially constant for a period of time representing the length of time required to develop proper gradient so that the heating effects on the body proper tend to become important. This point is indicated at 63 in curve 62 the voltage again continues to rise until it reaches a substantially stable condition at approximately 5.4 voltage units. During this period of time it will be noted by reference to curve 64 which represents the current through resistors 54, 55 of Fig. 2, that is the vane and transfer resistors, that no dissipation to the cooler occurs for quite a period after which the dissipation of the system rises quite rapidly to stable level corresponding to the stable level shown in curve 64.

While I have described my invention essentially as applied to a magnetron oscillator, it will be clear to those skilled in the art that the principles apply equally well to other types of resonator devices. For example, similar problems of frequency stabilisation exist in connection with the so called "klystron" and in other types of oscillator circuits utilizing complex resonator structures. In order to utilize the invention with any of these types of devices it is merely necessary to supply an equivalent or compensating network simulating the heat analogy effects of the resonator structure in electrical characteristics and to utilize the voltage so derived for compensating frequency drift.

While I have described above the principles of my invention in connection with specific apparatus, it is to be clearly understood that this description is made only by way of example and not as a limitation to the scope of my invention.

What is claimed is:

1. In a cavity resonator device subject to dimensional changes and consequent frequency deviation due to thermal effects of signal energy applied thereto from a signal source, a system for compensating said frequency deviations comprising an electrical network adjusted to produce a control voltage simulating said frequency deviation in response to applied energy from said source, said electrical network including a first network having condensers and resistors connected to simulate the heat capacity and heat flow in said device, an adjustable reference voltage source, means for comparing voltage from said first network and said reference voltage source to provide said control voltage, means for applying energy from said signal source to said electrical network simultaneously with application of energy to said device, tuning means coupled between said electrical network, reference voltage source and device, for tuning said device in response to said control voltage, and means for adjusting said reference voltage source simultaneously with said tuning means to balance said means for comparing.

2. A combination according to claim 1, wherein said tuning means and said reference voltage source are both provided with mechanical control devices further comprising a reversible motor coupled to said control devices, and means for applying said control voltage to operate said motor.

3. A system for compensating frequency deviation of a cavity resonator due to thermal dimensional changes therein comprising a source of pulse signals for periodically energizing said resonator, a tuner for said resonator, an electrical network having time constant circuits evaluated to simulate the heat capacity and thermal flow in said resonator, an adjustable comparison voltage source coupled to said tuner, whereby a predetermined comparison potential is developed, means for applying pulse signals of a predetermined amplitude from said sources to said network to develop a control potential proportional to said frequency deviation, a comparison circuit, means for applying said control potential and said comparison potential to said comparison circuit, a source of alternating current energy coupled to said comparison circuit, said comparison circuit operating to pass said alternating current energy in sense and amplitude dependent upon the direction and magnitude of the departure of said control potential from said comparison potential, a reversible tuner control coupled to said tuner to adjust the tuning of said resonator, under control of said passed alternating current energy, and means coupling said tuner control to said comparison voltage source to adjust said comparison voltage to substantial equality with said control potential.

4. A system for compensating frequency deviation of a magnetron oscillator due to thermal dimensional changes in the magnetron resonator comprising a source of pulse signals for periodically energizing said magnetron, a tuner for said magnetron, an electrical network having time constant circuits evaluated to simulate the thermal expansion effects in said resonator, a potentiometer coupled to said tuner, a source of reference potential coupled to said potentiometer to develop a comparison potential, means for applying pulse signals of a predetermined amplitude from said sources to said network to develop a control potential proportional to said frequency deviation, a comparison circuit, means for applying said control potential and said comparison potential to said comparison circuit, a source of alternating current energy coupled to said comparison circuit, said comparison circuit operating to pass said alternating current energy in sense and amplitude dependent upon the direction and magnitude of the departure of said control potential from said comparison potential, a reversible tuner control coupled to said magnetron to adjust the tuning of said magnetron under control of said passed alternating current energy, and means coupling said tuner control to said potentiometer to adjust said comparison voltage to substantial equality with said control potential.

5. A system for compensating frequency deviation of a magnetron oscillator due to thermal dimensional changes in the magnetron resonator comprising a source of pulse signals for periodically energizing said magnetron, a mechanical tuner for said magnetron, an electrical network having condensers and resistors evaluated and interconnected to simulate the heat capacity and thermal flow in said resonator, a potentiometer having its slider coupled to said tuner, a source of reference potential coupled to said potentiometer, whereby a predetermined comparison potential is developed at said slider, means for applying pulse signals of a predetermined amplitude from said sources to said network to develop a control potential proportional to said frequency deviation, a comparison circuit, means for applying said control potential and said comparison potential to said comparison circuit, a source of alternating current energy coupled to said comparison circuit, said comparison circuit operating as a gate to pass said alternating current energy in sense and amplitude dependent upon the direction and magnitude of the departure of said control potential from said comparison potential, a reversible motor, means for mechanically coupling said motor to said tuner to adjust the tuning of said magnetron, means under control of said passed alternating current energy for controlling the direction of operation of said motor, and mechanical means coupling said motor to said potentiometer slider to adjust said comparison voltage to substantial equality with said control potential.

PAUL W. CRAPUCHETTES.

References Cited in the file of this patent

UNITED STATES PATENTS

| Number | Name | Date |
|---|---|---|
| 1,956,547 | Black | May 1, 1934 |
| 2,462,856 | Ginzton | Mar. 1, 1949 |
| 2,473,188 | Albin | June 14, 1949 |